United States Patent [19]

Kitagishi

[11] 4,241,983
[45] Dec. 30, 1980

[54] TELEPHOTO LENS

[75] Inventor: Nozomu Kitagishi, Kawasaki, Japan

[73] Assignee: Canon Kabushiki Kaisha, Tokyo, Japan

[21] Appl. No.: 70,488

[22] Filed: Aug. 28, 1979

[30] Foreign Application Priority Data

Sep. 8, 1978 [JP] Japan .................................. 53-111070

[51] Int. Cl.³ .................................................. G02B 9/60
[52] U.S. Cl. .................................................. 350/216
[58] Field of Search ........................ 350/216, 220, 177

[56] References Cited

U.S. PATENT DOCUMENTS

| | | | |
|---|---|---|---|
| 3,774,991 | 11/1973 | Shimizu | 350/220 X |
| 3,854,797 | 12/1974 | Yakota | 350/214 |
| 3,868,174 | 2/1975 | Yakota | 350/177 X |

Primary Examiner—Paul A. Sacher
Attorney, Agent, or Firm—Toren, McGeady and Stanger

[57] ABSTRACT

A telephoto lens comprising; a front lens group comprising a positive lens, a negative lens and positive lens arranged in the written order from the object side, and having a positive refracting power, and a rear lens group arranged with a large space from the front group, in which the positive lens is made of an anomalous dispersion optical material, and the negative lens is made of lanthanum glass, and the telephoto lens satisfies the following conditions:

$$0.9 < \frac{\phi_1}{\phi_3} < 1.2 \quad (1)$$

$$\frac{1.8}{F} < |\phi_2| < \frac{2.4}{F} \quad (\phi_2 < 0) \quad (2)$$

$$\frac{1.8}{F} < \phi_3 < \frac{2.2}{F} \quad (3)$$

$$1.05 < \left|\frac{r_1}{r_2}\right| < 1.26 \quad (r_2 < 0) \quad (4)$$

$$0.35 < \left|\frac{r_5}{r_6}\right| < 0.47 \quad (r_6 < 0) \quad (5)$$

wherein F is the focal length of the whole system, $\phi_i$ is the refracting power of the i-th lens from the object side, and ri is the curvature radius of the i-th lens surface of the lens from the object side.

8 Claims, 16 Drawing Figures

FIG.1
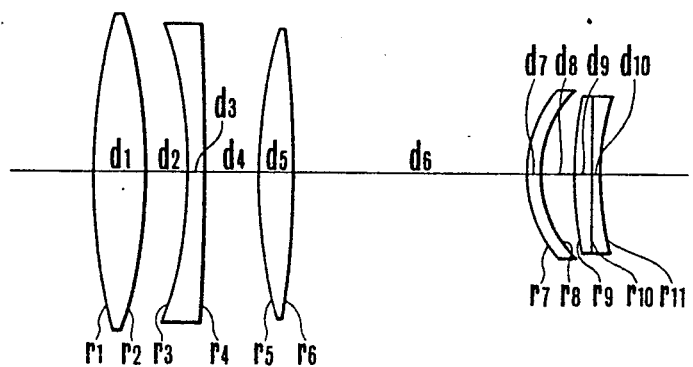
FIG.2A
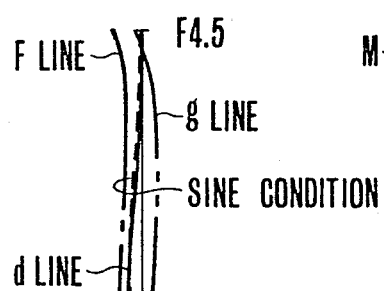
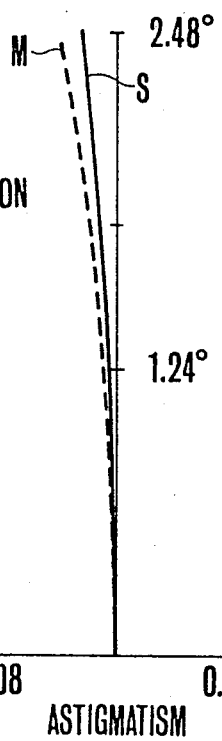
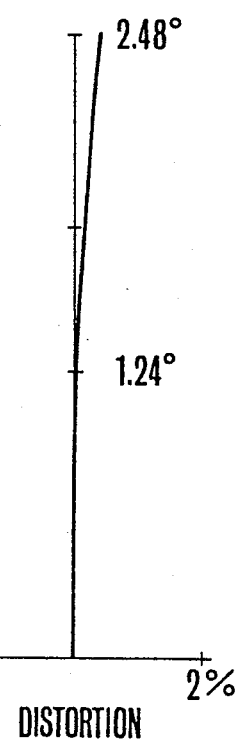

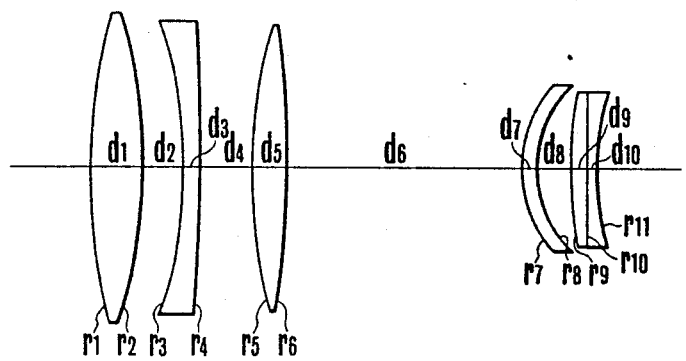
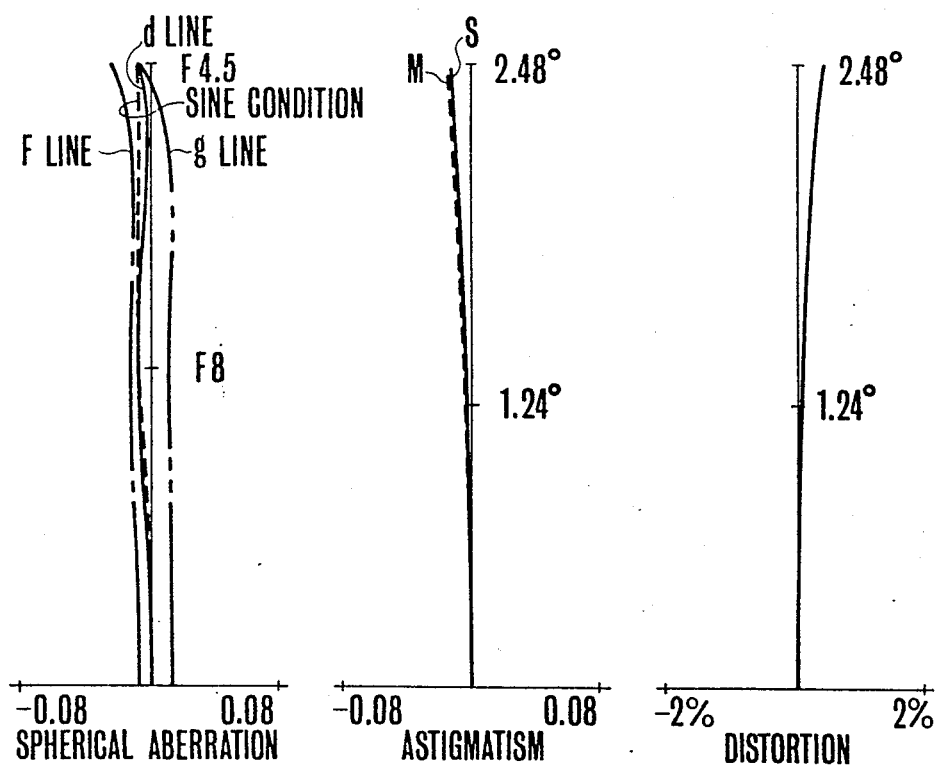

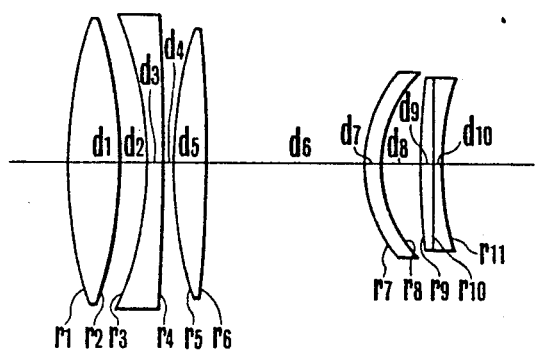
FIG.5
FIG.6A  FIG.6B  FIG.6C
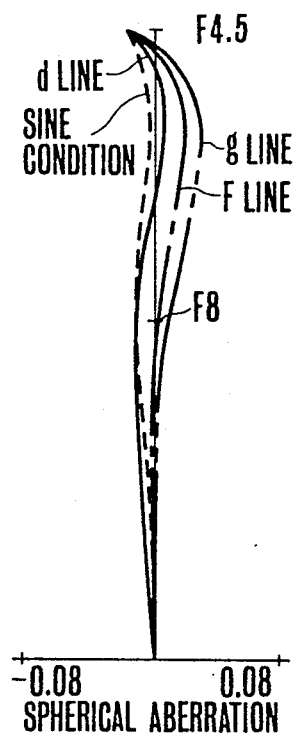
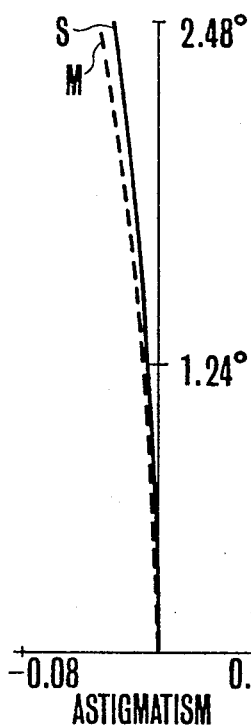
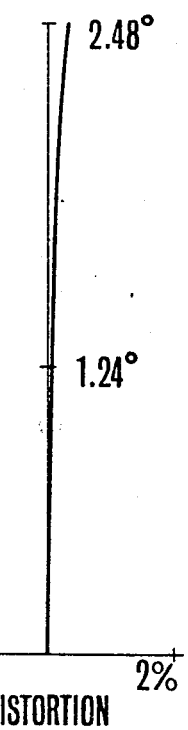

TELEPHOTO LENS

BACKGROUND OF THE INVENTION

This invention relates to a photographic lens, more particularly a telephoto lens free from a secondary spectrum.

In telephoto lenses, even when chromatic aberration has been corrected with respect to light rays of specific two wave lengths, chromatic aberration remaining in connection with light rays of other wave lengths, namely the so-called secondary spectrum is markedly large as compared with that of a lens having a shorter focal length, and it is known that amounts of this secondary spectrum may determine the performance of telephoto lenses.

The amount of the secondary spectrum is usually about 1/500 to 1/1000 of the focal length, so that the longer the focal length is the more the color flare or dispersion becomes.

As for methods for decreasing the amount of secondary spectrum, it has been proposed to use a positive lens made of anomalous dispersion optical glass materials in the front group of a telephoto lens, and for such optical materials, optical crystals of fluorite etc. and anomalous dispersion glasses having a low refractive index and a low dispersion rate are known.

Further it is also effective for dimishing the secondary spectrum to use lanthanum glass, instead of flint glass or dense flint glass for the negative lens in the front group of a telephoto lens. U.S. Pat. No. 3,868,174 discloses a telephoto lens in which the first positive lens in the front group is made of fluorite and the negative lens is made of lanthanum glass.

Meanwhile, a telephoto lens of rear focus type in which part of the rear group elements is moved to effect focusing is known in Laid-Open Patent Specification No. Sho 50-139732 (U.S. Pat. No. 3,854,797). It has been found, however, that the secondary spectrum cannot always be diminished by use of an optical material having an anomalous dispersion characteristics in a lens having a power arrangement and lens shape suitable for the rear focus as disclosed by the prior art. Therefore, the favorable effects of the low refractive index and the low dispersion rate cannot be fully utilized if the method of using the material is not appropriate.

BRIEF DESCRIPTION OF THE DRAWINGS

FIG. 1 shows the cross section of a lens corresponding to Example 1.

FIGS. 2A to 2C show various aberrations of the lens of Example 1.

FIG. 3 shows the cross section of a lens corresponding to Example 2.

FIGS. 4A to 4C show various aberrations of the lens of Example 2.

FIG. 5 shows the cross section of a lens corresponding to Example 3.

FIGS. 6A to 6C show various aberrations of the lens of Example 3.

SUMMARY OF THE INVENTION

Figure 7:
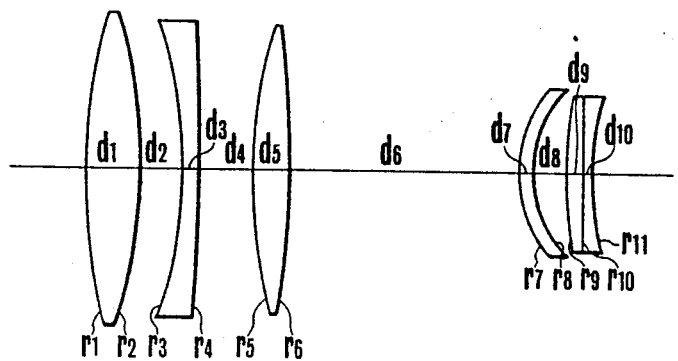
FIG. 7 shows the cross section of a lens corresponding to Example 4.

One of the objects of the present invention is to markedly diminish the secondary spectrum in a telephoto lens comprising a positive lens of anomalous dispersion optical material and a negative lens of lanthanum glass by arranging the lens powers effectively to fully develop the characteristics peculiar to these specific optical materials.

Another object of the present invention is to provide a telephoto lens in which the basic aberrations including the spherical aberration and coma aberration etc. are well corrected and the length of the total system is considerably shortened.

The structure of the telephoto lens according to the present invention is characterized by comprising:

a front group having a positive refracting power and comprising a positive lens, a negative lens and a positive lens arranged in the written order from the object side, and a rear group arranged with a large space from the front group, and that the positive lens in the front group is made of an anomalous dispersion optical material and the negative lens is made of lanthanum glass.

For more specific embodiments set forth hereinafter, the positive lens on the object side is made of fluorite and the positive lens on the image side is made of glass having a refractive index (nd) ranging from 1.43 to 1.52 in respect to the d line, an Abbe number ($\theta$vd) ranging from 80 to 95.1 and partial dispersion rate $$\theta \; (\theta g.d = \frac{ng - nd}{nF - nc})$$

ranging from 1.23 to 1.234 in respect to the g line and the d line.

Further the telephoto lens according to the present invention satisfies the following conditions.

$$0.9 < \frac{\phi_1}{\phi_3} < 1.2 \quad (1)$$

$$\frac{1.8}{F} < |\phi_2| < \frac{2.4}{F} \; (\phi_2 < 0) \quad (2)$$

$$\frac{1.8}{F} < \phi_3 < \frac{2.2}{F} \quad (3)$$

$$1.05 < \left|\frac{r_1}{r_2}\right| < 1.26 \; (r_2 < 0) \quad (4)$$

$$0.33 < \left|\frac{r_5}{r_6}\right| < 0.47 \; (r_6 < 0) \quad (5)$$

in which F is the focal length of the whole system, $\phi i$ is the refracting power of i-th lens from the object side and ri is the curvature radius of the i-th lens surface of the lens from the object side.

DESCRIPTION OF THE PREFERRED EMBODIMENTS

Before describing various numerical data of the lens according to the present invention, explanations will be made on the significance of the conditions (1) to (5).

The condition (1) determines the ratio of the refracting power between the positive lens on the object side and the positive lens on the image side in the front group, and in combination with the conditions (2) and (3) functions to decrease the secondary spectrum.

When a positive lens, a negative lens and a positive lens are arranged in the written order from the object side just as in a telephoto lens according to the present invention, the lens height from the optical axis of the axial light passing the positive lens is greater in the positive lens on the object side than in the positive lens on the image side. Meanwhile, the effect on the chromatic aberration works as the square of the height from the optical axis so that when the power arrangement is made so as to strongly develop the anomalous dispersion characteristics from a high level from the optical axis, the secondary spectrum diminishes.

Therefore, in the present invention, more of the refracting power is imposed on the positive lens on the object side than on the positive lens on the image side. However, if the refracting power of the positive lens on the object side is stronger than that of the positive lens on the image side beyond the upper limit defined by the condition (1), the balance in the lens power arrangement in the front group is broken, thus increasing the zonal spherical aberration and the coma aberration with respect to the d line and also increasing the spherical aberration and the coma aberration with respect to the short wave length light, although the secondary spectrum can be improved and the whole length of the system can be shortened. To the contrary, if the refracting power of the positive lens on the object side is smaller than that of the positive lens on the image side beyond the lower limit defined in the condition (1), the secondary spectrum is impermissibly increased and the whole optical length is increased.

The conditions (2) and (3) define the ranges of the refracting powers of the negative lens and the positive lens on the image side, and when the power is below the lower limit, the elimination effect of the secondary spectrum becomes scarce, and particularly in the case of the lanthanum glass of the negative lens has a relatively small dispersion, if the refracting power of the respective lenses is smaller than the lower limit, it is difficult to use the lanthanum glass effective to improve the secondary spectrum from the necessity of satisfying the achromatic conditions, and also the whole optical length increases.

When the refracting powers of the respective lenses of the front group are increased beyond the upper limits, the secondary spectrum tends to diminish, but the curvature radius of the lens surfaces become too strong so that the aberration, particularly such as the spherical aberration and the comatic aberration, increases. This is particularly disadvantageous for obtaining a high speed lens.

The conditions (4) and (5) define parameters for preventing the deterioration of the basic aberration with respect to the d line when the refracting power of the positive lens of the front group is intensified according to the conditions (1) and (3).

As the refracting powers of the both positive lenses are increased, if the curvature radius of the rear surface of the positive lens is stronger than that of the front surface beyond the upper limit defined by the conditions (4) and (5), it is no more possible to compensate the higher-order aberration, such as the spherical aberration and the comatic aberration, which is produced by the lens.

To the contrary, when the curvature radius of the front surface is stronger than that of the rear surface beyond the lower limit, the spherical aberration, the comatic aberration and the astigmatism deteriorate.

Hereinbelow numerical examples which satisfy the above conditions will be set forth.

Figures 8A, 8B, 8C:
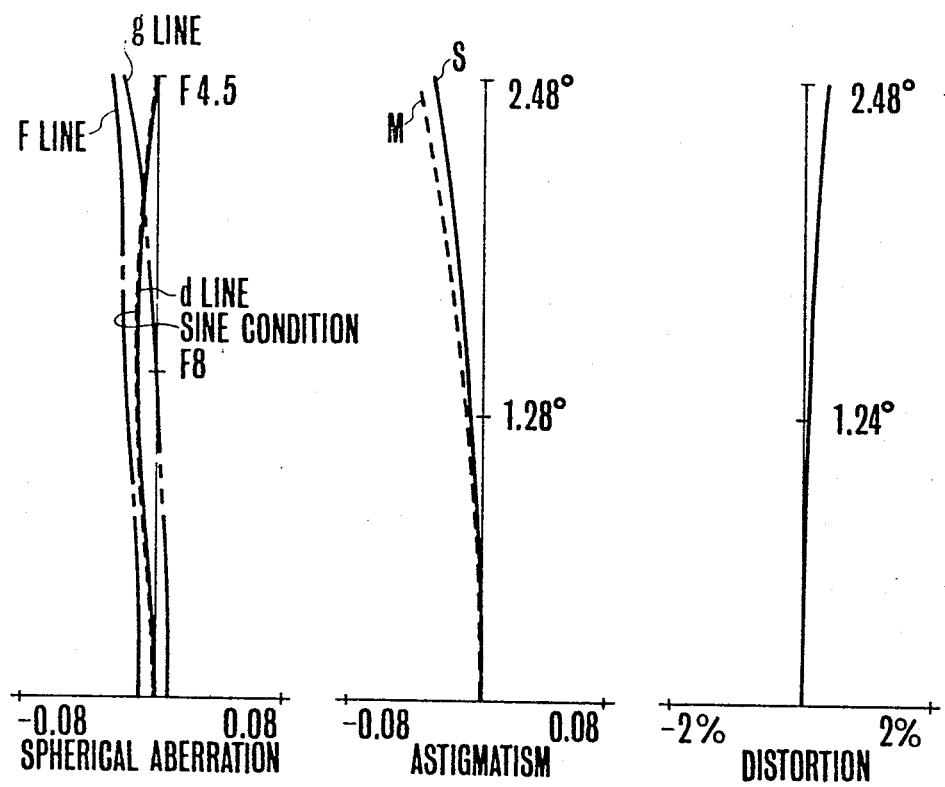
FIGS. 8A to 8C show various aberrations of the lens of Example 4.

Examples 1 to 4 correspond to FIG. 1, FIG. 3, FIG. 5 and FIG. 7 respectively, and FIG. 2, FIG. 4, FIG. 6 and FIG. 8 respectively show the spherical aberration, the astigmatism (M represents the meridional focal line, and S represents the sagital focal line), and the distortion.

In each of the following examples, the negative lens group consisting of the lens surfaces R9-R11 is movable in the direction of the optical axis so as to achieve focusing.

For the lens data, ri represents the curvature radius of the i-th lens surface, di represents the length of the space of the i-th lens surface, n represents the refractive index with respect to the d line, and V represents the Abbe number.

EXAMPLE 1

| Focal Length f = 100, F No. 1 : 45 Field Angle 2ω = 4.96° | | | | |
|---|---|---|---|---|
| ri | di | n | V | Glass Material |
| 1  46.936 | 3.70 | 1.43387 | 95.1 | CaF$_2$ |
| 2 −38.780 | 3.13 | | | |
| 3 −32.562 | 1.10 | 1.78590 | 44.2 | LaSF01 |
| 4 −202.835 | 3.92 | | | |
| 5  38.098 | 2.60 | 1.49700 | 8.16 | FK01 |
| 6 −82.648 | 17.33 | | | |
| 7  10.555 | 1.00 | 1.58913 | 61.1 | SK5 |
| 8  9.509 | 2.54 | | | |
| 9  44.376 | 1.10 | 1.75520 | 27.5 | SF4 |
| 10 286.858 | 0.60 | 1.71300 | 53.9 | LaK8 |
| 11  21.058 | | | | |

Total Length (from the first surface to the image plane) 83.21

$\dfrac{\phi_1}{\phi_3} = 1.0688$   $\left|\dfrac{r_1}{r_2}\right| = 1.2103$ $\phi_2 = -0.0202$
$\phi_3 = 0.0189$   $\left|\dfrac{r_5}{r_6}\right| = 0.461$ $\theta_{g,d} = 1.23317$
Axial Chromatic Aberration
g line  0.00802
C line  0.01147
F line −0.00775

EXAMPLE 2

| Focal Length f = 100, F No. 1 : 4.5, Field Angle 2ω = 4.96° | | | | |
|---|---|---|---|---|
| ri | di | n | V | Glass Material |
| 1  46.879 | 3.34 | 1.43387 | 95.1 | CaF$_2$ |
| 2 −38.778 | 3.26 | | | |
| 3 −32.349 | 1.10 | 1.74400 | 44.7 | LaF$_2$ |
| 4 −266.194 | 3.94 | | | |
| 5  35.571 | 2.49 | 1.48656 | 84.5 | FK51 |
| 6 −90.733 | 17.30 | | | |
| 7  10.570 | 1.00 | 1.58913 | 61.1 | SK5 |
| 8  9.473 | 2.50 | | | |
| 9  43.477 | 1.10 | 1.75520 | 27.5 | SF4 |
| 10 285.753 | 0.60 | 1.71300 | 53.9 | LaK8 |
| 11  20.917 | | | | |

Total Length: 82.668

$\dfrac{\phi_1}{\phi_3} = 1.0679$   $\left|\dfrac{r_1}{r_2}\right| = 1.2089$ $\phi_2 = -0.02016$
$\phi_3 = 0.01892$   $\left|\dfrac{r_5}{r_6}\right| = 0.3290$ $\theta_{g,d} = 1.2309$
Axial Chromatic Aberration
g line  0.014056
C line  0.013648
F line −0.007162

EXAMPLE 3

| | ri | di | n | V | Glass Material |
|---|---|---|---|---|---|
| | Focal Length f = 100, F No. 1 : 4.5, Field Angle 2ω = 4.96° | | | | |
| 1 | 35.863 | 3.75 | 1.43387 | 95.1 | $CaF_2$ |
| 2 | −33.670 | 1.87 | | | |
| 3 | −29.852 | 1.10 | 1.78590 | 44.2 | LaSF01 |
| 4 | −292.016 | 0.83 | | | |
| 5 | 31.613 | 2.49 | 1.49700 | 81.6 | FK01 |
| 6 | −89.181 | 11.61 | | | |
| 7 | 11.710 | 1.00 | 1.58913 | 61.1 | SK5 |
| 8 | 10.081 | 2.91 | | | |
| 9 | 61.753 | 1.10 | 1.75520 | 27.5 | SF4 |
| 10 | −99.094 | 0.60 | 1.71300 | 53.9 | LaK8 |
| 11 | 23.246 | | | | |

Total Length: 79.46

$\frac{\phi_1}{\phi_3} = 1.1627$     $\left|\frac{r_1}{r_2}\right| = 1.0651$ $\phi_2 = -0.02359$
$\phi_3 = 0.02114$     $\left|\frac{r_5}{r_6}\right| = 0.3545$
$\theta_{g,d} = 1.23317$ Axial Chromatic Aberration
g line     0.00292
C line     −0.00608
F line     0.00343

EXAMPLE 4

| | ri | di | n | V | Glass Material |
|---|---|---|---|---|---|
| | Focal Length f = 100, F No. 1 : 4.5, Field Angle 2ω = 4.96° | | | | |
| 1 | 53.571 | 3.02 | 1.43387 | 95.1 | $CaF_2$ |
| 2 | −42.806 | 3.23 | | | |
| 3 | −35.220 | 1.10 | 1.78590 | 44.2 | LaSF01 |
| 4 | −229.068 | 3.84 | | | |
| 5 | 38.666 | 2.49 | 1.49700 | 81.6 | FK01 |
| 6 | −86.252 | 17.55 | | | |
| 7 | 10.505 | 1.00 | 1.58913 | 61.1 | SK5 |
| 8 | 9.559 | 2.69 | | | |
| 9 | 48.049 | 1.10 | 1.75520 | 27.5 | SF4 |
| 10 | 172.013 | 0.60 | 1.71300 | 53.9 | LaK8 |
| 11 | 24.453 | | | | |

Total Length: 86.33

$\frac{\phi_1}{\phi_1} = 0.9767$     $\left|\frac{r_1}{r_2}\right| = 1.2515$ $\phi_2 = -0.01884$
$\phi_3 = 0.01849$     $\left|\frac{r_5}{r_6}\right| = 0.4483$ $\theta_{g,d} = 1.23317$
Axial Chromatic Aberration
g line     0.00292
C line     −0.00608
F line     0.00343

What is claimed is:

1. A telephoto lens comprising:
a front lens group comprising a positive lens, a negative lens and positive lens arranged in the written order from the object side, and having a positve refracting power, and
a rear lens group arranged with a space from the front group, said positive lens being made of an anomalous dispersion optical material, and said negative lens being made of lanthanum glass,
said telephoto lens satisfying the following conditions:

$$0.9 < \frac{\phi_1}{\phi_1} < 1.2 \quad (1)$$

$$\frac{1.8}{F} < |\phi_2| < \frac{2.4}{F} \quad (\phi_2 < 0) \quad (2)$$

$$\frac{1.8}{F} < \phi_3 < \frac{2.2}{F} \quad (3)$$

$$1.05 < \left|\frac{r_1}{r_2}\right| < 1.26 \quad (r_2 < 0) \quad (4)$$

$$0.35 < \left|\frac{r_5}{r_6}\right| < 0.47 \quad (r_6 < 0) \quad (5)$$

wherein F is the focal length of the whole system, $\phi_i$ is the refracting power of the i-th lens from the object side, and ri is the curvature radius of the i-th lens surface of the lens from the object side.

2. A telephoto lens according to claim 1, in which the positive lens on the object side in the front group is made of fluorite and the positive lens on the image side is made of glass material having:
a refracting force nd ranging from 1.43 and 1.52 with respect to the d line,
an Abbe number ranging from 80 to 95.1, and a partial dispersion ratio θ ranging from 1.23 to 1.234 with respect to the g line and the d line.

3. A telephoto lens according to claim 1, in which the rear group comprises a fixed sub-lens group and at least a movable sub-lens group movable in the optical axial direction for focusing.

4. A telephoto lens according to claim 3, in which the both sub-lens groups have a negative power.

5. A telephoto lens according to claim 4, which shows the following lens data when normalized to a focal length=100, F No. 1:4.5, angle of view 2ω=4.96°:

| | ri | di | n | V |
|---|---|---|---|---|
| 1 | 46.936 | 3.70 | 1.43387 | 95.1 |
| 2 | −38.780 | 3.13 | | |
| 3 | −32.562 | 1.10 | 1.78590 | 44.2 |
| 4 | −202.835 | 3.92 | | |
| 5 | 38.098 | 2.60 | 1.49700 | 81.6 |
| 6 | −82.648 | 17.33 | | |
| 7 | 10.555 | 1.00 | 1.58913 | 61.1 |
| 8 | 9.509 | 2.54 | | |
| 9 | 44.376 | 1.10 | 10.75520 | 27.5 |
| 10 | 286.858 | 0.60 | 1.71300 | 53.9 |
| 11 | 21.058 | | | | in which ri represents the curvature radius of the i-th lens surface, di represents the length of the i-th lens space, n represents the refracting force with respect to the d line, and V represents the Abbe number.

6. A telephoto lens according to claim 4, which shows the following lens data where normalized to a focal length=100, F No. 1:4.5, angle of view 2ω=4.96°:

| | ri | di | n | V |
|---|---|---|---|---|
| 1 | 46.879 | 3.34 | 1.43387 | 95.1 |
| 2 | −38.778 | 3.26 | | |
| 3 | −32.349 | 1.10 | 1.74400 | 44.7 |
| 4 | −266.194 | 3.94 | | |
| 5 | 35.571 | 2.49 | 1.48656 | 8.45 |
| 6 | −90.733 | 17.30 | | |
| 7 | 10.570 | 1.00 | 1.58913 | 61.1 |
| 8 | 9.473 | 2.50 | | |
| 9 | 43.477 | 1.10 | 1.75520 | 27.5 |
| 10 | 285.753 | 0.60 | 1.71300 | 53.9 |
| 11 | 20.917 | | | |

7. A telephoto lens according to claim 4, which shows the following lens data where normalized to a focal length = 100, F No. 1:4.5, angle of view 2ω = 4.96°:

|    | ri       | di    | n       | V    |
|----|----------|-------|---------|------|
| 1  | 35.863   | 3.75  | 1.43387 | 95.1 |
| 2  | −33.670  | 1.87  |         |      |
| 3  | −29.852  | 1.10  | 1.78590 | 44.2 |
| 4  | −292.016 | 0.83  |         |      |
| 5  | 31.613   | 2.49  | 1.49700 | 81.6 |
| 6  | −89.181  | 11.61 |         |      |
| 7  | 11.710   | 1.00  | 1.58913 | 61.1 |
| 8  | 10.081   | 2.91  |         |      |
| 9  | 61.753   | 1.10  | 1.75520 | 27.5 |
| 10 | −99.094  | 0.60  | 1.71300 | 53.9 |
| 11 | 23.246   |       |         |      |

8. A telephoto lens according to claim 4, which shows the following lens data when normalized to a focal length = 100, F No. 1:4.5, angle of view 2ω = 4.96°:

|    | ri       | di    | n       | V    |
|----|----------|-------|---------|------|
| 1  | 53.571   | 3.02  | 1.43387 | 95.1 |
| 2  | −42.806  | 3.23  |         |      |
| 3  | −35.220  | 1.10  | 1.78590 | 44.2 |
| 4  | −229.068 | 3.84  |         |      |
| 5  | 38.666   | 2.49  | 1.49700 | 81.6 |
| 6  | −86.252  | 17.55 |         |      |
| 7  | 10.505   | 1.00  | 1.58913 | 61.1 |
| 8  | 9.559    | 2.69  |         |      |
| 9  | 48.049   | 1.10  | 1.75520 | 27.5 |
| 10 | 172.013  | 0.60  | 1.71300 | 53.9 |
| 11 | 24.453   |       |         |      |

* * * * *